United States Patent
Andersson et al.

(10) Patent No.: US 12,529,347 B2
(45) Date of Patent: Jan. 20, 2026

(54) METHOD FOR CONTROLLING THE OPERATION OF A HYDROGEN COMBUSTION ENGINE SYSTEM OF A VEHICLE

(71) Applicant: VOLVO TRUCK CORPORATION, Gothenburg (SE)

(72) Inventors: Lennart Andersson, Skällinge (SE); Jonas Jansson, Hönö (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/876,061

(22) PCT Filed: Jul. 4, 2022

(86) PCT No.: PCT/EP2022/068442
§ 371 (c)(1),
(2) Date: Dec. 17, 2024

(87) PCT Pub. No.: WO2024/008271
PCT Pub. Date: Jan. 11, 2024

(65) Prior Publication Data
US 2025/0376959 A1     Dec. 11, 2025

(51) Int. Cl.
*F02D 41/02*      (2006.01)
*F01N 3/10*      (2006.01)
*F01N 3/20*      (2006.01)

(52) U.S. Cl.
CPC ......... *F02D 41/0245* (2013.01); *F01N 3/106* (2013.01); *F01N 3/2066* (2013.01); *F02D 2200/0606* (2013.01)

(58) Field of Classification Search
CPC ........... F01N 3/2066; F02D 2200/0606; F02D 41/0245
See application file for complete search history.

(56) References Cited

U.S. PATENT DOCUMENTS 10,364,723 B2    7/2019    Raux
10,989,085 B1    4/2021    Jung
(Continued)

FOREIGN PATENT DOCUMENTS

DE      10128414 A1    12/2002
DE      10332047 A1    1/2005
(Continued)

OTHER PUBLICATIONS

Machine generated English translation DE10332047A1 obtained from Espacenet.*

(Continued)

*Primary Examiner* — Ngoc T Nguyen
(74) *Attorney, Agent, or Firm* — Jeffri A. Kaminski; Venable LLP

(57) ABSTRACT

A method for controls the operation of a hydrogen combustion engine system of a vehicle including a hydrogen combustion engine and an exhaust aftertreatment system, EATS, to reduce emissions in the engine exhausts. The EATS comprises a selective catalyst reduction, SCR, catalyst and an ammonia slip catalyst, ASC, arranged downstream of the SCR catalyst. The method includes: identifying a regeneration time window for performing regeneration of the ASC; in response of identifying the regeneration time window, operating the hydrogen combustion engine in an H2 exhaust excess mode defined by an amount of unburnt H2 of at least 1.5 mol % in the engine exhaust and regenerating the ASC by using the unburnt H2 in the engine exhausts and reaching a regeneration temperature of at least 500° C.

14 Claims, 4 Drawing Sheets

(56) References Cited

U.S. PATENT DOCUMENTS

| | | |
|---|---|---|
| 2012/0233986 A1 | 9/2012 | Geveci et al. |
| 2014/0331644 A1 | 11/2014 | Kumar et al. |
| 2016/0186629 A1 | 6/2016 | Osburn et al. |
| 2016/0298514 A1 | 10/2016 | Raux |

FOREIGN PATENT DOCUMENTS

| | | | |
|---|---|---|---|
| DE | 102020006451 A1 | 3/2021 | |
| DE | 102021003777 A1 | 11/2021 | |
| DE | 102021005095 A1 | 4/2022 | |
| EP | 1395351 B1 | 11/2005 | |
| EP | 3528929 B1 | 8/2023 | |
| WO | 2022000013 A1 | 1/2022 | |
| WO | 2022055852 A1 | 3/2022 | |
| WO | WO-2024137947 A1 * | 6/2024 | ............ F02D 41/40 |

OTHER PUBLICATIONS

International Search Report and Written Opinion of the International Searching Authority in related International Application No. PCT/EP2022/068438 mailed Feb. 1, 2023 (16 pages).

International Preliminary Report on Patentability in related International Application No. PCT/EP2022/068438 mailed Dec. 21, 2023 (7 pages).

International Search Report and Written Opinion of the International Searching Authority in corresponding International Application No. PCT/EP2022/068442 mailed Mar. 3, 2023 (12 pages).

Notice of Allowance dated Oct. 10, 2025 in corresponding U.S. Appl. No. 18/875,390, 9 pages.

\* cited by examiner

METHOD FOR CONTROLLING THE OPERATION OF A HYDROGEN COMBUSTION ENGINE SYSTEM OF A VEHICLE

CROSS-REFERENCE TO RELATED APPLICATIONS

This application is a U.S. National Stage application of PCT/EP2022/068442, filed Jul. 4, 2022 and published on Jan. 11, 2024, as WO 2024/008271, all of which is hereby incorporated by reference in its entirety.

TECHNICAL FIELD

The present invention relates to a method for controlling the operation of a hydrogen combustion engine system of a vehicle, the hydrogen combustion engine system comprising a hydrogen combustion engine and an exhaust aftertreatment system, EATS, configured to reduce emissions of the engine exhausts. The invention further relates to a hydrogen combustion engine system of a vehicle, and to a vehicle comprising such engine system, as well as to a computer program and to a computer readable medium carrying a computer program.

The invention is applicable on vehicles, in particularly heavy vehicles, such as e.g. trucks. However, although the invention will mainly be described in relation to a truck, the hydrogen combustion engine system is also applicable for other types of vehicles, such as buses, passenger cars, industrial construction machines, wheel loaders, etcetera.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that are important aspects when choosing vehicle engine. Furthermore, in the field of trucks, there are applicable law directives that have e.g. determined the maximum amount of exhaust gas pollution allowable. Still further, a reduction of the overall cost of the vehicle is important and since the engine constitutes a relatively large portion of the total costs, it is desirable that also the costs of engine components are reduced.

In order to meet the described demands, various engine concepts have been developed throughout the years where conventional engine cylinders have been combined with e.g. a pre-compression stage and/or an expansion stage. Other engine concepts relates to the fuel used and combusted in the combustion engine. For example, gasoline and diesel can be exchanged to more environmentally friendly fuels, e.g. biofuels such as e.g. ethanol. In some cases, when exchanging the fuel, the combustion engine needs to be adapted to optimally operate on the new fuel. Lately, clean combustion engines, such as e.g. near zero emission combustion engines have become increasingly interesting. For example, by changing the fuel to hydrogen, or a hydrogen based fuel, the combustion of hydrogen with oxygen produces only water as biproduct (theoretically).

However, even though the engine is subject to adaptations in order to operate on the new fuel, NOx is typically formed during the high temperature combustion process, why cleaning of the engine exhausts is required. There is thus a need in the industry for engine system comprising an adapted exhaust aftertreatment system, EATS, to handle emissions from the hydrogen combustion engine. Moreover, certain emission reducing components of the EATS are in need of periodically maintenance or regeneration to improve their performance over time.

SUMMARY

It is an object of the present invention to at least partly alleviate the shortcomings discussed above in relation to known exhaust aftertreatment system, EATS, and to provide an improved system.

According to a first aspect of the present invention, a method for controlling the operation of a hydrogen combustion engine system of a vehicle, the hydrogen combustion engine system comprising a hydrogen combustion engine and an exhaust aftertreatment system, EATS, configured to reduce emissions in the engine exhausts, the EATS comprising a selective catalyst reduction, SCR, catalyst and an ammonia slip catalyst, ASC, arranged downstream of the SCR catalyst, is provided. The method comprises:

identifying a regeneration time window for performing regeneration of the ASC, the regeneration time window being defined at least by that the temperature of the EATS is above a predetermined lower limit and that the temperature of the SCR catalyst is below a predetermined upper limit; and in response of identifying the regeneration time window, operating the hydrogen combustion engine in an H2 exhaust excess mode defined by an amount of unburnt H2 of at least 1.5 mol % in the engine exhaust and regenerating the ASC using the unburnt H2 in the engine exhausts, reaching a regeneration temperature of at least 500° C.

Hereby, the ASC may be regenerated in an efficient manner. By identifying a regeneration time window for performing regeneration of the ASC, and then in response to that regeneration time window, operating the hydrogen combustion engine in the H2 exhaust excess mode and using the unburnt H2 in the engine exhausts to regenerate the ASC, an efficient method for regenerating the ASC is provided. During the regeneration of the ASC, H2 is burned in the ASC resulting in the increased temperature, whereby regeneration of the ASC is achieved. During the regeneration, particles and/or pollutants, such as e.g. sulphur containing pollutants, are burned off in the ASC.

It should be understood that the regeneration time window is a predefined regeneration time window. According to at least one example embodiment, the identified regeneration time window is belonging to a group of predefined regeneration time windows for which regeneration of the ASC is to be performed. By defining the predefined regeneration window, or said groups of predefined regeneration time windows, at least by that the temperature of the EATS is above a predetermined lower limit and that the temperature of the SCR catalyst is below a predetermined upper limit, the time window for regenerating the ASC ensures at least that prevailing temperature in the EATS is suitable for performing the method. That is, the regeneration time window ensures at least that prevailing temperature in the EATS is appropriate for transporting the unburnt H2 to the ASC, and that the initial temperature for regenerating the ASC is appropriate. The regeneration time window is to be understood as a time period at which at least the following temperature criteria is fulfilled: the temperature of the EATS is above a predetermined lower limit; and the temperature of the SCR catalyst is below a predetermined upper limit.

Stated differently, for a time period at which the temperature of the EATS is above a predetermined lower limit, and the temperature of the SCR catalyst is below a predetermined upper limit, regeneration of the ASC is performed by operating the hydrogen combustion engine in the H2 exhaust excess mode and using the unburnt H2 in the engine exhausts to regenerate the ASC.

According to at least one example embodiment, the method comprises the step of determining the temperature of the ASC during the regeneration. The temperature may be measured (e.g. by a temperature sensor) or it may be modelled (calculated, using a thermal model of the ASC or the EATS).

According to at least one example embodiment, the regeneration temperature of the ASC is defined as an average temperature over the ASC. For example, the average temperature of the ASC is based on the temperature at the ASC inlet and the temperature at the ASC outlet. As a further alternative, the regeneration temperature of the ASC is defined as the temperature at the ASC inlet, or the temperature of an inlet portion of the ASC.

According to at least one example embodiment, the method comprises the step of:
determining the temperature of the EATS, at least by determining the temperature of the SCR catalyst; and in response of determining that the temperature of the EATS is above the predetermined lower limit and that the temperature of the SCR catalyst is below the predetermined upper limit, identify that a regeneration time window is present.

According to at least one example embodiment, the temperature of the EATS is defined as an average temperature over the EATS. For example, the average temperature of the EATS is based on the temperature at the exhaust gas inlet (i.e. EATS inlet) and the temperature at the EATS outlet. As a further alternative, the temperature of the EATS is defined as the temperature at the exhaust gas inlet, or the temperature of an inlet portion of the EATS, such as e.g. the temperature upstream of the SCR catalyst. As a further alternative, the temperature of the EATS is defined as the temperature of the SCR catalyst. For the latter, the regeneration time window is defined at least by that the temperature of the SCR catalyst is above a predetermined lower limit and that the temperature of the SCR catalyst is below a predetermined upper limit.

According to at least one example embodiment, the predefined upper limit is set to a temperature at which the unburnt H2 is not combusted in the SCR catalyst. According to at least one example embodiment, the predefined upper limit is set to a value between 300° C. and 400° C., e.g. to 350° C.

For example, it is believed that each 1 mol % H2 results in a temperature increase of approximately 80° C. in the ASC as H2 is burned in the ASC during regeneration. If the temperature at the SCR catalyst is 380° C., this means that the temperature in the ASC during regeneration will be approximately 500° C. By adapting the amount of unburnt H2 in the engine exhausts with the predetermined upper and lower limits, a temperature of at least 500° C. in the ASC during the regeneration can be achieved.

According to at least one example embodiment, the predefined lower limit is set to a temperature at which the concentration of H2 can be kept at moderate levels and to avoid flame ignition of the H2 which otherwise is a risk at too high concentrations of H2.

According to at least one example embodiment, the predefined lower limit is set to a value between 200° C. and 250° C., e.g. to 200° C.

According to at least one example embodiment, the H2 exhaust excess mode comprises operating the hydrogen combustion engine by injecting H2 in the engine cylinder during an exhaust stroke.

Hereby, H2 is less susceptible to be combusted in the engine cylinder, and the amount of unburnt H2 in the engine exhausts of at least 1.5 mol % can easier be achieved. Thus, H2 is injected into the engine cylinder during an exhaust stroke of the piston in the engine cylinder, resulting in that the injected H2 is transported out of the engine cylinder during the exhaust stroke (along with the other gases).

According to at least one example embodiment, the H2 exhaust excess mode comprises operating the hydrogen combustion engine by injecting H2 downstream of an exhaust valve of at least one of the engine cylinders in the hydrogen combustion engine. Hereby, the injection of H2 may be performed outside of the engine cylinder(s) and thus be made less dependent of the operating cycle of the engine cylinders, and directly into the engine exhausts in order to achieve an amount of unburnt H2 of at least 1.5 mol % in the engine exhausts. Moreover, by injecting H2 downstream of an exhaust valve of at least one of the engine cylinders in the hydrogen combustion engine, the H2 is less likely to be combusted by hot surfaces inside the hydrogen combustion engine.

According to at least one example embodiment, the H2 exhaust excess mode is comprised in a combustion mode of the hydrogen combustion engine.

A combustion mode is a mode in which the engine cylinder(s) of the hydrogen combustion engine perform at least one combustion during an operating cycle. For example, in a four stroke cycle of the hydrogen combustion engine, four distinct piston strokes can be defined within the engine cylinder(s) to complete one operating cycle: intake, compression, power (combustion), and exhaust. In such example, the piston achieves two complete passes in the engine cylinder to complete one operating cycle. The hydrogen combustion engine may comprise one of more engine cylinders being configured to be operated in the same way. For example, each one of the engine cylinders may be configured to be operated according to the previously mentioned four stroke cycle.

According to at least one example embodiment, said step of injecting H2 in the engine cylinder during an exhaust stroke is performed during said combustion mode of the hydrogen combustion engine.

Hereby, H2 is injected into the engine cylinder(s) after combustion (as compared to the same operating cycle), and may thus be passed to the engine exhausts without being combusted, at least to reach an amount of unburnt H2 as defined above. For example, the H2 is injected into the engine cylinder(s) after the exhaust valve has opened, such as e.g. at least 10 crank angle degrees after the exhaust valve has opened. According to at least one example embodiment, the H2 is injected into the engine cylinder(s) between 90 crank angle degrees before TDC, and TDC, or between 130 crank angel degrees and 60 crank angle degrees before TDC. The exhaust stroke is typically an exhaust stroke in the above mentioned four stroke cycle in a combustion mode of the hydrogen combustion engine.

According to at least one example embodiment, the H2 exhaust excess mode comprises operating the hydrogen combustion engine by injecting H2 during a compression stroke in the engine cylinder to reach a target lambda.

Hereby, combustion of H2 in the engine cylinder(s) is achieved.

Thus, and according to at least one example embodiment, H2 may be injected into the engine cylinder(s) at least twice during one operating cycle (e.g. the four stroke cycle previously described) by a primary H2 injection during the compression stroke, and a secondary H2 injection during the exhaust stroke. In a normal operating mode of the hydrogen combustion engine, such as a default combustion mode, only the primary H2 injection is utilized as there is no need for an excess of H2 in the engine exhausts. In the normal combustion mode, the amount of H2 in the engine exhausts is typically between 0.02 mol % and 0.15 mol %. Thus, the H2 exhaust excess mode may be distinguished from the default combustion mode by the secondary H2 injection, and may thus be referred to as an H2 secondary injection mode.

The target lambda refers to the target air-fuel equivalence ratio, and may be determined by the ratio of actual air-fuel ratio (mass of air to fuel) to stoichiometric air-fuel ratio, for a given mixture. According to at least one example embodiment, the target lambda is above 1, such as e.g. between 1.5 and 3. Hereby, the NOx in the engine exhausts can be kept low.

According to at least one example embodiment, the hydrogen combustion engine comprises a fuel injector for each engine cylinder for injecting H2 into the engine cylinder(s). According to at least one example embodiment, the fuel injector is used for both the primary H2 injection and the secondary H2 injection as described above. In other words, the method may comprise performing a primary H2 injection into the engine cylinder(s) during the compression stroke (to reach a target lambda) by the fuel injector, and performing a secondary H2 injection into the engine cylinder(s) during the exhaust stroke by said fuel injector. As an alternative embodiment, said fuel injector is a primary fuel injector configured to perform the primary H2 injection, wherein the hydrogen combustion engine further comprises a secondary fuel injector configured to perform the secondary H2 injection. In other words, the method may comprise performing a primary H2 injection into the engine cylinder(s) during the compression stroke (to reach a target lambda) by the primary fuel injector, and performing a secondary H2 injection into the engine cylinder(s) during the exhaust stroke by the secondary fuel injector. For example, the secondary fuel injector may be arranged to inject H2 in the engine cylinder closer to the exhaust valve as compared to the primary fuel injector.

As previously mentioned, H2 may be injected downstream of the exhaust valve of at least one of the engine cylinders in the hydrogen combustion engine. Thus, and according to at least one example embodiment, the secondary fuel injector may be arranged downstream of the exhaust valve of said engine cylinder in the hydrogen combustion engine. That is, the secondary H2 injection may be performed outside of the engine cylinder(s) and directly into the engine exhausts in order to achieve an amount of unburnt H2 of at least 1.5 mol % in the engine exhausts. The secondary fuel injector may e.g. be arranged somewhere between downstream of the exhaust valve of at least one of the engine cylinders, and upstream of an inlet to the EATS, e.g. at the engine outlet or at an exhaust passage downstream of the exhaust valve. Thus, the secondary H2 injection may be achieved by injecting H2 into the engine exhausts somewhere between downstream of the exhaust valve of at least one of the engine cylinders, and upstream of an inlet to the EATS.

According to at least one example embodiment, the hydrogen combustion engine system comprises an H2 storage tank comprising the H2 fuel (typically pressurized H2). For example, both the primary and secondary fuel injectors are configured to supply H2 from the H2 storage tank. That is, both the primary and secondary fuel injectors are configured to supply H2 fuel from the same H2 storage tank. For example, the method may comprise performing a primary H2 injection into the engine cylinder(s) during the compression stroke (to reach a target lambda) by the primary fuel injector utilizing H2 fuel from the H2 storage tank, and performing a secondary H2 injection to achieve an amount of unburnt H2 of at least 1.5 mol % in the engine exhausts by the secondary fuel injector utilizing H2 fuel from the (same) H2 storage tank. Thus, the unburnt H2 in the engine exhausts is originating from the H2 storage tank, and is not combusted in the hydrogen combustion engine.

According to at least one example embodiment, the H2 exhausts excess mode comprises operating the hydrogen combustion engine by injecting water during an intake stroke in the engine cylinder.

This may be particularly advantageous at relatively low target lambda, e.g. lambda between 1.5 and 2, in order to reduce NOx in the engine exhausts.

According to at least one example embodiment, in response to receiving instruction to reduce target lambda to a predefined level (e.g. below 1.8), injecting H2 in the engine cylinder(s) during an exhaust stroke for at least two operating cycles of the engine cylinder(s), e.g. four stroke cycles as previously described, at a target lambda above the predefined level, prior to reducing the lambda to said predefined level. Hereby, unburnt H2 in the engine exhausts may be provided to the ASC prior to reaching an operation of the hydrogen combustion engine at the predefined level of target lambda. In other words, the EATS is prepared in advance of reaching the predefined level of the target lambda.

According to at least one example embodiment, the H2 exhaust excess mode is defined by an amount of unburnt H2 of at most 4 mol %. Thus, the H2 exhaust excess mode may be defined by an amount of unburnt H2 of between 1.5 mol % and 4 mol %.

It should be noted that by the expression "an amount of unburnt H2 of at least X mol %", is referring to the mole fraction of H2 in the exhaust gases (i.e. the mol percentage of H2 in the exhaust gases), and may simply be referred to as "an amount of H2 of at least X mol %".

According to at least one example embodiment, the H2 exhaust excess mode is comprised in a non-combustion mode of the hydrogen combustion engine.

Thus, the hydrogen combustion engine may be operated without the previously mentioned primary H2 injection. The injection of H2 in order to achieve an amount of unburnt H2 of at least 1.5 mol % may be performed in the engine cylinder(s) during an exhaust stroke as previously mentioned, or downstream of the exhaust valve of at least one of the engine cylinders in the hydrogen combustion engine, as previously mentioned. Preferably, the secondary fuel injector is used for such H2 injection.

According to at least one example embodiment, the regeneration time window is further defined at least by that the amount of NOx and/or NH3 downstream of the ASC is above a respective predetermined emission threshold value.

By defining the predefined regeneration window, or said groups of predefined regeneration time windows, further at least that the NOx and/or NH3 downstream of the ASC is above a respective predetermined emission threshold value, the time window for regenerating the ASC ensures at least that prevailing temperature in the EATS, and the prevailing amount of NOx and/or NH3 downstream of the ASC, are suitable for performing the method. That is, the regeneration time window ensures at least that prevailing temperature in the EATS is suitable for transporting the unburnt H2 to the ASC, and that the initial temperature for regenerating the ASC is suitable, while also ensuring that regeneration of the ASC is motivated based on the amount of NOx and/or NH3 downstream of the ASC. Stated differently, for a time period at which the temperature of the EATS is above a predetermined lower limit, and the temperature of the SCR catalyst is below a predetermined upper limit, and at which the amount of NOx and/or NH3 downstream of the ASC is above a respective predetermined emission threshold value, regeneration of the ASC is performed by operating the hydrogen combustion engine in the H2 exhaust excess mode and using the unburnt H2 in the engine exhausts to regenerate the ASC. The predetermined emission threshold value for the NOx may be referred to as a predetermined NOx emission threshold value, and the predetermined emission threshold value for the NH3 may be referred to as a predetermined NH3 emission threshold value. The amount of NOx and NH3 may be in mol fraction, or be based on weight, e.g. as a weight-to-volume (W/V) concentration. Moreover, the amount of NOx and NH3 may be determined per travelled distance, or per unit operational time or weight per energy, g/kWh.

According to at least one example embodiment, the method comprises the step of:
  determining the amount of NOx and/or NH3 downstream of the ASC, and in response of determining that at least one of the amount of NOx and NH3 is above a respective predetermined emission threshold value, identify that a regeneration time window is present.

According to at least one example embodiment, the regeneration time window is further defined by an absence of engine braking of the hydrogen combustion engine.

Engine braking may lead to excessively high temperatures in the engine cylinder(s) and/or in the engine exhausts, why it will be more difficult to reach the above defined amount of unburnt H2 in the engine exhausts.

According to at least one example embodiment, the regeneration time window is further defined at least by that the lapsed time since the last regeneration of the ASC is above a predetermined time period threshold value.

Hereby, the regeneration time window can be adapted based on estimated or expected degeneration or fouling of the catalyst coating in the ASC. For example, regardless of the NOx or NH3 downstream of the ASC, the ASC may be desired to be regenerate in response to the build-up of fouling on the catalyst coating over time.

According to at least one example embodiment, the method further comprises:
  prefilling the SCR catalyst with ammonia prior to operating the hydrogen combustion engine in the H2 excess combustion mode.

Hereby, injection of reductant during the regeneration of the ASC may be avoided.

According to at least one example embodiment, the method further comprises:
  transporting the unburnt H2 from an engine outlet of the hydrogen combustion engine to the ASC such that the mol fraction of the H2 in the exhaust gases reaching the ASC is at least 80% of that at the engine outlet.

Thus, most unburnt H2 from the engine outlet can be received by the ASC. For example at least a majority of the unburnt H2 from the engine outlet is received by the ASC. The unburnt H2 is typically transported from the engine outlet to the ASC by the exhaust gases in the EATS. A majority of the unburnt H2 is kept from being burned by that the temperature of the SCR catalyst is below the predetermined upper limit EATS, e.g. below 350° C. Moreover, the temperature of any internal wall structure in EATS, from the engine outlet to the ASC, is preferably below a predetermined wall structure temperature, e.g. below 600° C.

It should be noted that the engine outlet and the exhaust gas inlet (or EATS inlet) are making up the interface between the hydrogen combustion engine and the EATS. Typically, the engine exhaust at the engine outlet continues as exhaust gases in the EATS downstream of the exhaust gas inlet. According to at least one example embodiment, the exhaust gas inlet defines the interface between the hydrogen combustion engine and the EATS. Thus, the exhaust gas inlet is the furthest upstream portion of the EATS, thus being an end-point of the EATS. Correspondingly, the engine outlet is the furthest downstream portion of the hydrogen combustion engine. The EATS typically comprise a fluid pathway for the exhaust gases received from the engine outlet of the hydrogen combustion engine, which extends from the exhaust gas inlet to an outlet of the EATS.

According to at least one example embodiment, the ASC is a monolith catalyst comprising an oxidation catalyst and a metal-zeolite coating. The oxidation catalyst is configured to convert ammonia to NOx, and the metal-zeolite is configured to convert NOx to N2. The oxidation catalyst may e.g. be Pd, Pt or Rh, and the metal-zeolite may e.g. be Cu-zeo or Fe-zeo. The metal-zeolite may e.g. be arranged on top of the oxidation catalyst. The conversion of NOx to N2 using the metal-zeolite is typically facilitated by ammonia present in the exhaust gases. The oxidation catalyst and/or the metal-zeolite may be applied to the monolith by a corresponding powder coating. According to at least one example embodiment, the monolith may be a flow through monolith or a wall-flow monolith. The monolith of the ASC may be referred to as a monolith substrate, and may e.g. be a ceramic monolith.

Thus, during (normal) operation of the EATS, the ASC is configured to reduce emission by ammonia oxidation and NOx conversion. In use, ammonia enters the ASC with the exhaust gases, and is at least partially oxidized to NO (or NOx). The oxidized NO and ammonia inside the ASC, not yet oxidized, consequently react to N2 by catalytic conversion using the metal-zeolite (i.e. following the usual SCR reaction schemes).

According to at least one example embodiment, the coating of the oxidation catalyst is increasing along the ASC from the ASC inlet to the ASC outlet. As the temperature of the ASC during the regeneration may become particularly high at the ASC inlet, it may be beneficial to have a relatively thin coating the oxidation catalyst at the ASC inlet, wherein the coating is gradually thickened towards the ASC outlet.

According to at least one example embodiment, the method further comprises:
  terminating operation of the hydrogen combustion engine in the H2 exhaust excess mode in response to a requested torque or brake power of the hydrogen combustion engine over a corresponding predetermined threshold value.

A torque or engine brake exceeding the predetermined threshold value may lead to excessively high temperatures in the engine cylinder(s) and/or in the engine exhausts, why it will be more difficult to reach the above defined amount of unburnt H2 in the engine exhausts.

According to at least one example embodiment, the method further comprises:

in response of not identifying the regeneration time window, preventing the hydrogen combustion engine to be operated in the H2 exhaust excess mode.

Hereby, regeneration of the ASC using unburnt H2 in the engine exhausts is avoided. For example, the method may comprise identifying a non-regeneration time window in which regeneration of the ASC is to be avoided, the non-regeneration time window being defined at least by that the temperature of the EATS is below the predetermined lower limit and/or that the temperature of the SCR catalyst is above the predetermined upper limit.

According to a second aspect of the present invention, a hydrogen combustion engine system for a vehicle is provided. The hydrogen combustion engine system comprises a hydrogen combustion engine and an exhaust aftertreatment system, EATS, configured to reduce emissions in the engine exhausts, the EATS comprising a selective catalyst reduction, SCR, catalyst and an ammonia slip catalyst, ASC, arranged downstream of the SCR catalyst, wherein the hydrogen combustion engine system comprises a control unit configured to:

identify a regeneration time window for performing regeneration of the ASC, the regeneration time window being defined at least by that the temperature of the EATS is above a predetermined lower limit and that the temperature of the SCR catalyst is below a predetermined upper limit;

in response of identifying the regeneration time window, instruct the hydrogen combustion engine to operate in an H2 exhaust excess mode defined by an amount of unburnt H2 of at least 1.5 mol % in the engine exhaust for using the unburnt H2 in the engine exhausts to regenerate the ASC by reaching a regeneration temperature of at least 500° C.

Effects and features of the second aspect of the invention are largely analogous to those described above in connection with the first aspect of the invention. Embodiments mentioned in relation to the first aspect of the invention are largely compatible with the second aspect of the invention, of which some are exemplified below.

According to at least one example embodiment, the control unit is configured to cause the hydrogen combustion engine system to execute the steps of the method of the first aspect of the invention. According to at least one example embodiment, the control unit is configured to perform a regeneration of the ASC by reaching a regeneration temperature of at least 500° C. using the unburnt H2 in the engine exhausts. For example, the control unit comprises instructions to perform said regeneration of the ASC.

According to at least one example embodiment, the hydrogen combustion engine is configured to be operated by an Otto cycle.

According to at least one example embodiment, the hydrogen combustion engine is an internal combustion engine configured to combust hydrogen in one or more engine cylinders of the engine. The engine cylinder(s) referred to throughout the application text may be referred to as combustion cylinder(s). It should be understood that when referring to the configuration or operation of an/the engine cylinder in the application text, the configuration or operation is referring to at least one of the engine cylinders, or all of the engine cylinders, of the hydrogen combustion engine.

For example, the hydrogen combustion engine is configured to be operated by four-stroke combustion in the engine cylinder(s). Typically, the hydrogen combustion engine is configured to be operated by a lambda of between 1.5 and 3.

For example, the hydrogen combustion engine system comprises a transportation pipe defining a fluid pathway for transporting the exhaust gases from an exhaust gas inlet of the EATS to an EATS outlet. Thus, unburnt H2 from the engine exhausts may be transported to the ASC and there be used to regenerate the ASC by reaching a regeneration temperature of at least 500° C. According to at least one example embodiment, the EATS is free of any oxidation catalyst arranged downstream of the exhaust gas inlet of the EATS and upstream of the ASC. Thus, typically, the transportation pipe defining the fluid pathway is free of any oxidation catalyst.

Hereby, the unburnt H2 from the engine exhausts can more easily reach the ASC without being combusted.

According to a third aspect of the invention, a vehicle comprising a hydrogen combustion engine system according to the second aspect of the invention is provided.

According to a fourth aspect of the invention, a computer program comprising program code means comprising instructions to cause the hydrogen combustion engine system of the second aspect of the invention to execute the steps of the method of the first aspect of the invention, when said program is run on a computer is provided.

According to a fifth aspect of the invention, a computer readable medium carrying a computer program comprising program code means comprising instructions to cause the hydrogen combustion engine system of the second aspect of the invention to execute the steps of the method of the first aspect of the invention, when said computer program is run on a computer is provided.

Effects and features of the third to fifth aspects of the invention are largely analogous to those described above in connection with the first and second aspects of the invention. Embodiments mentioned in relation to the first and second aspects of the invention are largely compatible with the third to fifth aspects of the invention.

It should be understood that the SCR catalyst and the ASC form different emission reducing modules in the EATS. For example, each emission reducing module may comprise a container or canister housing the emission reducing components, such as various catalysts and substrates.

According to at least one example embodiment, applicable to any one of the first to fifth aspects of the invention, the EATS further comprises at least one particulate filter. The particulate filter may be arranged between the SCR catalyst and the ASC, or downstream of the ASC. According to at least one example embodiment, the particulate filter is integrated with the SCR catalyst (i.e. housed in the same container or canister) and is arranged upstream of the SCR catalyst.

According to at least one example embodiment, applicable to any one of the first to fifth aspects of the invention, the EATS further comprises:

an injector configured to inject a reductant for providing ammonia to the SCR catalyst, wherein the injector is arranged upstream of the SCR catalyst, and downstream of the exhaust gas inlet.

Hereby, during normal operation of the EATS (typically not when regenerating the ASC), reductant is injected upstream the SCR catalyst. Thus, the flow of exhaust gases through the EATS transports the injected reductant to the SCR catalyst. The injector may be arranged anywhere between the exhaust gas inlet and the SCR catalyst. The reductant used by the injector may be at least one of the following: anhydrous ammonia, aqueous ammonia, urea, aqueous urea and a diesel exhaust fluid. According to at least one example embodiment, the reductant is urea or liquid urea. As previously mentioned, the ASC is configured to handle the excess ammonia which is not utilized in the SCR catalyst.

According to at least one example embodiment, applicable to any one of the first to fifth aspects of the invention, the SCR catalyst is a metal-zeolite SCR catalyst, e.g. Cu-zeo or Fe-zeo. As an alternative, the SCR catalyst may comprise a Vanadia-based coating. The SCR catalyst is thus configured to convert nitrogen oxides, NOx, with the aid of the SCR catalyst coating (i.e. the metal-zeolite or the Vanadia-based coating) into diatomic nitrogen, N, and water. During operation of the EATS, the injected reductant (or the resulting ammonia) is reacted onto the SCR catalyst coating. The SCR catalyst coating may be applied to the substrate of the SCR catalyst by means of a washcoat, i.e. be applied to the substrate by means of an aqueous slurry, dried and calcined. Hereby, application of the SCR catalyst coating in the substrate is facilitated. As an alternative, the SCR catalyst coating may be applied by means of a powder coating. The substrate of the SCR catalyst may be a monolith, such as a ceramic monolith.

According to at least one example embodiment, applicable to any one of the first to fifth aspects of the invention, the hydrogen combustion engine system further comprises various sensors at various locations in the EATS known to the skilled person. For example NH3 and/or NOx sensors may be located at, or proximate, the exhaust gas inlet and/or outlet of the EATS. Moreover, temperature sensors, and/or pressure sensors, may be located before and/or after any one of the emission reducing modules, such as the SCR catalyst and the ASC. Furthermore, the hydrogen combustion engine system may comprise one or more sensors for measuring the amount of H2 in the hydrogen combustion engine system. For example, an H2 sensor may be arranged at the engine outlet for measuring the amount of H2 in the engine exhausts. Additionally or alternatively, an H2 sensor may be arranged upstream of the ASC for measuring the amount of H2 in the exhaust gases entering the ASC. The hydrogen combustion engine system may further comprise a controller configured to control e.g. the introduction of reductant into the fluid pathway of the exhaust gases.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
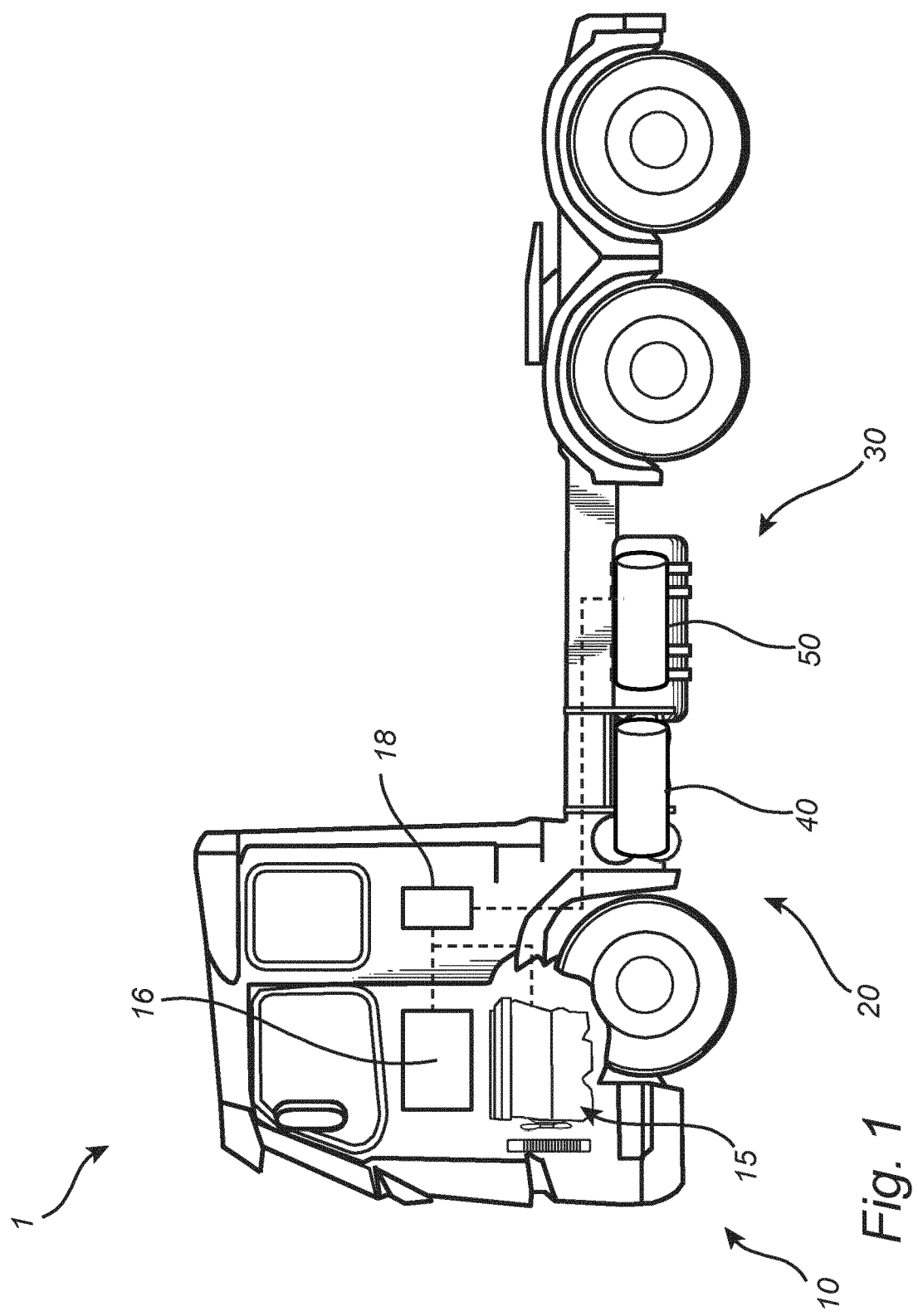
FIG. 1 is a schematic side view of a vehicle comprising a hydrogen combustion engine system, and an exhaust aftertreatment system of the hydrogen combustion engine system, in accordance with an example embodiment of the invention.

With reference to FIG. 1 a vehicle 1, here embodied as a heavy duty truck 1, is shown for which a hydrogen combustion engine system 10 of a kind disclosed in the present disclosure is advantageous. However, the hydrogen combustion engine system 10 may as well be implemented in other types of vehicles, such as in busses, light-weight trucks, passenger cars, marine applications etc. The hydrogen combustion engine system 10 of the vehicle 1 of FIG. 1 comprises a hydrogen combustion engine 15 and an exhaust aftertreatment system, EATS, 20 configured to reduce emission of the engine exhausts from the hydrogen combustion engine 15. However, the vehicle may according to at least one example embodiment be a hybrid vehicle further comprising an electric machine or fuel cell 16 (optional). The hydrogen combustion engine 15 is powered by hydrogen fuel (also referred to as H2 fuel), typically comprised in a fuel tank (also referred to as H2 storage tank), and any electric machine is typically powered by electricity supplied from at least one energy storage or transformation device, e.g. a battery (not shown) or a fuel cell, while any fuel cell is typically powered by hydrogen fuel, e.g. from said fuel tank. The hydrogen combustion engine 15 is preferably configured to be operated by an Otto cycle, or another four stroke cycle. The operation of the hydrogen combustion engine system 10 may e.g. be controlled by a control unit 18.

In FIG. 1, the EATS 20 comprises a plurality of emission reducing modules 30 arranged downstream of an exhaust gas inlet (shown in FIG. 2) of the EATS 20. The emission reducing modules 30 are configured to reduce emissions of the engine exhausts. The plurality of emission reducing modules 30 comprises at least a first emission reducing module 40, here being a selective catalyst reduction, SCR catalyst 40, and a second reducing module 50, here being an ammonia slip catalyst, ASC. In FIG. 1, the SCR catalyst 40 is arranged upstream of the ASC 50. The SCR catalyst 40 is configured to convert nitrogen oxides, also referred to as NOx, with the aid of a SCR catalyst coating, into diatomic nitrogen, N2, and water, and the ASC 50 is configured to reduce emission by ammonia oxidation and NOx conversion, as will be described with reference to FIG. 2. The EATS 20 typically comprise further components such as e.g. piping and may comprise additional emission reducing components (not shown in FIG. 1).

Figure 2:
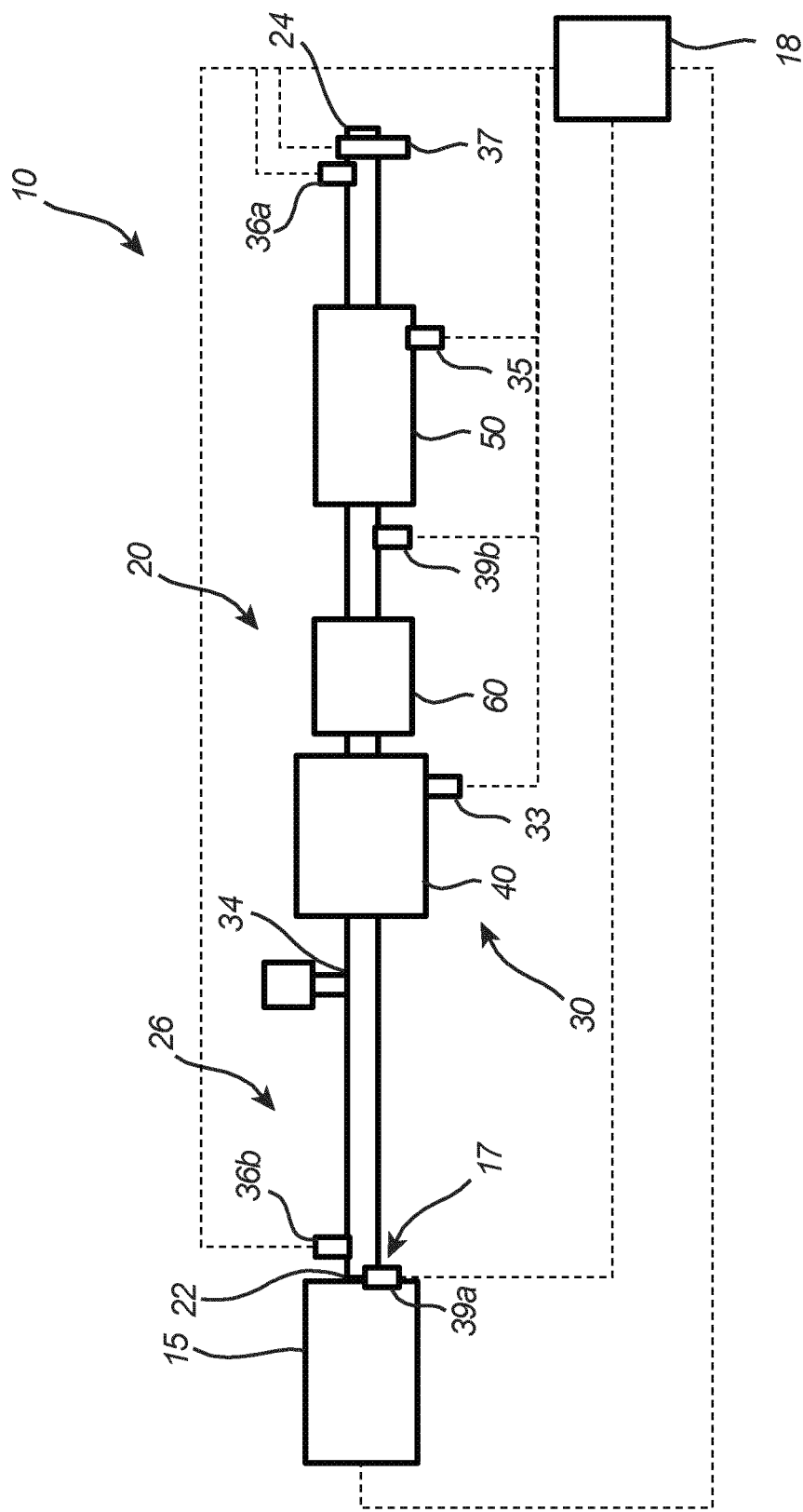
FIG. 2 is a schematic view of a hydrogen combustion engine system, and an exhaust aftertreatment system of the hydrogen combustion engine system, of a vehicle in accordance with example embodiments of the invention.

In FIG. 2, the hydrogen combustion engine system 10 of FIG. 1 is shown in greater detail. Thus, the hydrogen combustion engine system 10 comprises the hydrogen combustion engine 15 and the exhaust aftertreatment system, EATS, 20 configured to reduce emissions of the engine exhausts, described briefly with reference to FIG. 1. The engine exhaust entering the EATS is in the following referred to as exhaust gases.

The EATS 20 comprises an exhaust gas inlet 22 for receiving engine exhaust from an engine outlet 17 of the hydrogen combustion engine 15, an EATS outlet 24 for discharging at least partly cleaned exhaust gases from the EATS 20, and a fluid pathway 26 for transporting the exhaust gases from the exhaust gas inlet 22 to the EATS outlet 24. The EATS outlet 24 may e.g. be connected to, or comprise, the tailpipe of the vehicle 1. The EATS 20 further comprises a plurality of emission reducing modules 30 arranged downstream of the exhaust gas inlet 22. The emission reducing modules 30 are configured to reduce emissions of the engine exhausts along the fluid pathway 26. In the embodiment of FIG. 2, the plurality of emission reducing modules 30 is composed of the previously mentioned first emission reducing module being a selective catalyst reduction, SCR catalyst 40, and the previously mentioned second reducing module being an ammonia slip catalyst, ASC, 50. The ASC 50 is arranged downstream of the SCR catalyst 40. Moreover, in the embodiment of FIG. 2, an optional third emission reducing module 60, here being a particulate filter, is arranged in between the SCR catalyst 40 and the ASC 50.

The SCR catalyst 40 preferably comprises an SCR catalyst coating being a metal-zeolite SCR catalyst, e.g. Cu-zeo or Fe-zeo. As an alternative, the SCR catalyst coating is a Vanadia-based coating. The SCR catalyst 40 is designed to convert nitrogen oxides, NOx, with the aid of the SCR catalyst coating into diatomic nitrogen, N, and water. The SCR catalyst 40 typically comprises a substrate, e.g. a monolith, onto which the SCR catalyst coating is arranged.

The ASC 50 preferably comprises an oxidation catalyst and metal-zeolite. That is, the ASC 50 preferably comprises a first ASC coating being an oxidation catalyst and comprises a second ASC coating being a metal-zeolite (i.e. having SCR catalyst functionality) The ASC 50 is designed to convert ammonia to NOx with the aid of the oxidation catalyst, and to convert NOx to N2 with the aid of the metal-zeolite. The ASC 50 typically comprises a substrate, e.g. a monolith, onto which the first and second ASC coatings are arranged.

The particulate filter 60 is configured to remove particles, e.g. particulate emissions or soot, from the exhaust gases. The particulate filter 60 is in the embodiment of FIG. 2 arranged in between the SCR catalyst 40 and the ASC 50, but may according to an alternative example embodiment be arranged upstream of the SCR catalyst 40. In such embodiment, particulate emissions, such as e.g. sulphur containing emissions, is filtered from the exhaust gases upstream of the SCR catalyst 40, thereby reducing the deterioration of the downstream arranged SCR catalyst coating.

Moreover, in order to provide ammonia to the SCR catalyst 40, and the ASC 50, the EATS 20 comprises an injector 34 configured to inject a reductant to the fluid pathway 26 upstream of the SCR catalyst 40, and downstream of the exhaust gas inlet 22. The reductant may e.g. be urea. Thus, the injector 34 may be configured to inject urea. During operation of the EATS 20, the injected reductant (or the resulting ammonia) is transported to the SCR catalyst 40 by means of the exhaust gases, and is reacted onto the SCR catalyst coating. Reductant, or ammonia, which passes the SCR catalyst 40 unreacted is handled in the ASC 50 as previously described.

The EATS 20 of the hydrogen combustion engine system 10 of FIG. 2 is typically operated in the following manner: engine exhausts, or exhaust gases (to be cleaned) from the hydrogen combustion engine 15, leave the engine outlet 17 and enter the EATS 20 via the exhaust gas inlet 22, and encounters the SCR catalyst 40. Upstream of the SCR catalyst 40 and downstream of the exhaust gas inlet 22, reductant is injected via the injector 34. The injected reductant is thus mixed with the exhaust gases. Typically, the reductant is evaporated and hydrolysed into ammonia (by a heater or by being heated by the exhaust gases). In the SCR catalyst 40, catalytic reduction of NOx in the exhaust gases is performed by the aid ammonia and the SCR catalyst coating. Thereafter, the exhaust gases passes through the particulate filter 60 (which is optional). whereafter the at least partly cleaned exhaust gases encounter the ASC 50. In the ASC 50, emissions are further reduced by ammonia oxidation and NOx conversion, whereafter the exhaust gases are discharged from the EATS 20 via the EATS outlet 24.

As also shown in FIG. 2, the EATS 20 may comprise means for providing determination/measurement of various parameters, such as e.g. the temperature of the SCR catalyst 40 and/or the ASC 50 by means of temperature sensors 33, 35. Moreover, the amount of NOx may be determined/measured at the EATS outlet 24 by means of a NOx sensor 37, e.g. the molar fraction of NOx, or weight of NOx per travelled distance, weight per unit operational time or weight per energy (g/kWh). The NOx sensor may alternative or additionally be configured to determine/measure the corresponding amount of NH3. In the embodiment of FIG. 2, a first temperature sensor 33 is arranged to directly measure the temperature of the SCR catalyst 40, and a second temperature sensor 35 is arranged to directly measure the temperature of the ASC 50. Note, however, that the temperature SCR catalyst 40 may be determined by an estimation using at least one temperature sensor arranged upstream and/or downstream of the SCR catalyst 40, and/or that the temperature of the ASC 50 may be determined by an estimation using at least one temperature sensor arranged upstream and/or downstream of the ASC 50, e.g. a temperature sensor arranged at the EATS outlet 24. Moreover, a third temperature sensor 36a is configured to measure the temperature at the EATS outlet 24, and a fourth temperature sensor 36b is configured to measure the temperature at the exhaust gas inlet 22. Hereby, the temperature of the EATS 20 may be determined by an average value using the third and fourth temperature sensors 36a, 36b, and/or the temperature of the EATS 20 at the exhaust gas inlet 22 may be determined using the fourth temperature sensor, and/or the temperature of the EATS 20 at the EATS outlet 24 may be determined using the third temperature sensor 36a.

Furthermore, the hydrogen combustion engine system 10 may comprise one or more sensors for measuring the amount of H2 in the hydrogen combustion engine system 10. For example, as shown in the example embodiment of FIG. 2, a first H2 sensor 39a is arranged at the engine outlet 17 for measuring the amount of H2 in the engine exhausts, and a second H2 sensor 39b is arranged upstream of the ASC 50 for measuring the amount of H2 in the exhaust gases entering the ASC 50. The operation of the hydrogen combustion engine system 10 may as previously described be controlled by a control unit 18.

Figure 3A:
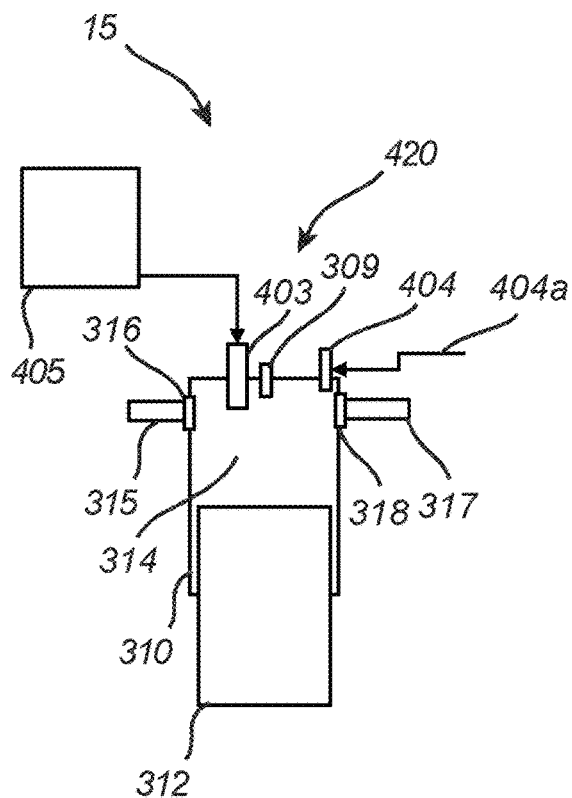
FIG. 3A is a schematic view of at least parts of a hydrogen combustion engine according to an example embodiment of the present invention.

An example embodiment of the configuration of the hydrogen combustion engine 15 and the operation thereof will now be described in more detail with reference to FIG. 3A. FIG. 3A schematically shows an engine cylinder (or combustion cylinder) 310 housing a piston 312, of the hydrogen combustion engine 15. Typically, a plurality of such engine cylinders and corresponding pistons is comprised in the hydrogen combustion engine 15. In more detail, the piston 312 is configured for reciprocal movement within the engine cylinder 310, wherein a combustion chamber 314 is comprised in the engine cylinder 310 above the piston 312. The hydrogen combustion engine 15 further comprising a spark plug 309 arranged in the combustion chamber 314. The piston 312 may be a dual acting piston in which the engine cylinder 310 is a combustion cylinder, and the hydrogen combustion engine 15 further comprises a compressor cylinder (not shown).

The hydrogen combustion engine 15 comprises an air intake passage 315 being arranged downstream of e.g. an air chamber fluidly connected to a compressor (not shown). Air, or compressed air, is fed to the combustion chamber 314 via the intake passage 315, and is regulated by an intake valve 316. Moreover, the hydrogen combustion engine 15 comprises an exhaust passage 317 regulated by an exhaust valve 318.

As can be seen in FIG. 3A, the hydrogen combustion engine 15 comprises an injection system 420 comprising a fuel injector 403 configured to supply H2 (typically as a gaseous fuel) to the combustion chamber 314. The fuel injector 403 is fluidly connected to at least one H2 storage tank 405 comprising pressurized H2 fuel or a hydrogen based gas (or a fuel which easily can conform to form hydrogen). The injection system 420 may further comprise a water inlet arrangement 404 configured for supplying a water based fluid medium 404a to the combustion chamber 314.

The hydrogen combustion engine 15 may be operated according to an Otto cycle or another four stroke combustion mode. The four stroke cycle of the hydrogen combustion engine thus comprises four distinct piston strokes within the engine cylinder 310 to complete one operating cycle: intake of air or compressed air via the air intake passage 315 and the intake vale 316 as the piston 312 moves reciprocally away from TDC, compression as the piston 312 moves reciprocally towards TDC, power or combustion as the H2 fuel is combusted using the spark plug 309, and exhaust in which the engine exhausts leaves the combustion chamber 314 via the exhaust passage 317 and the exhaust valve 318.

Figure 4:
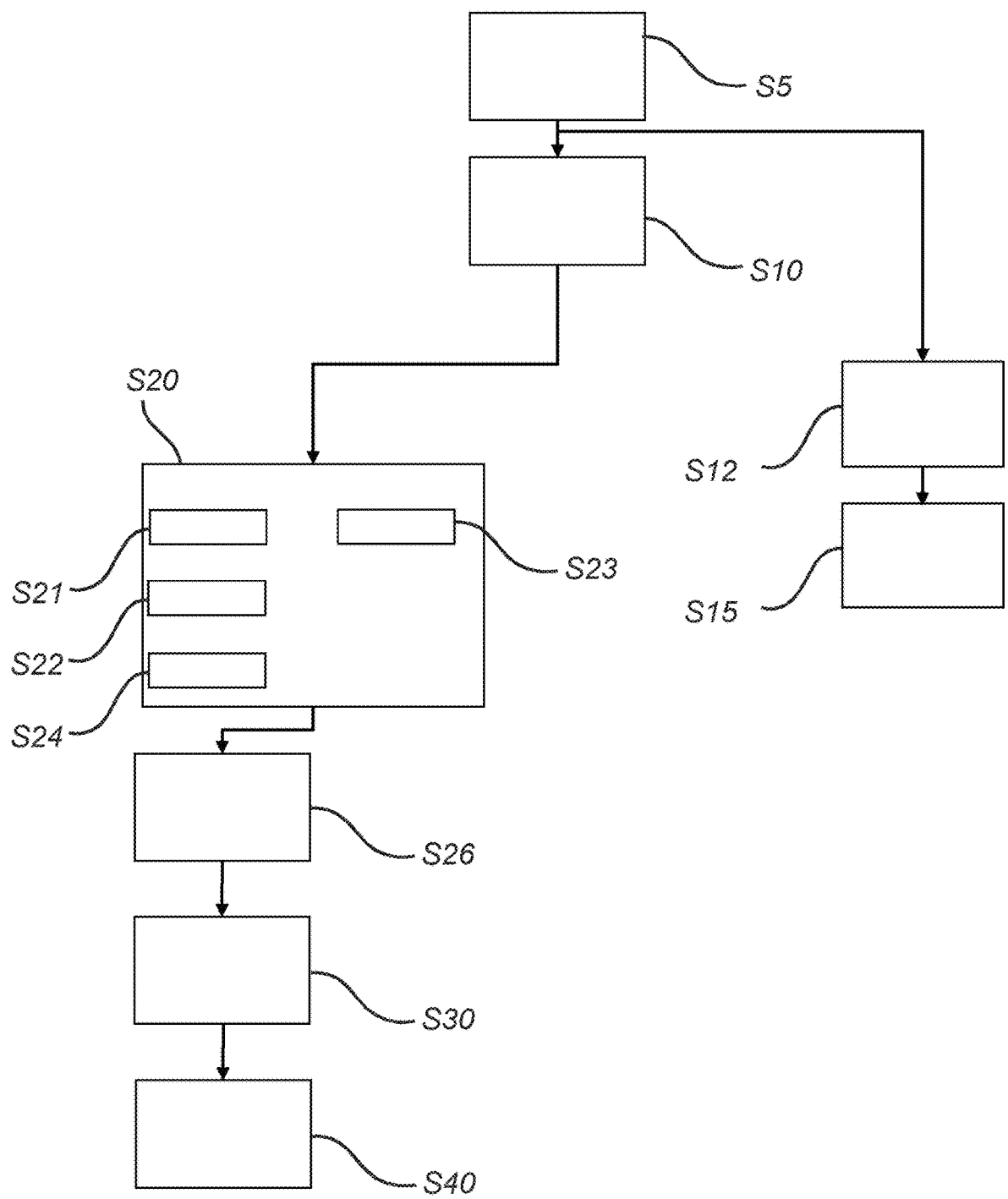
FIG. 4 is a flowchart illustrating the steps of a method in accordance with example embodiments of the invention.

A method for controlling the operation of a hydrogen combustion engine system of a vehicle will now be described with reference to the flowchart of FIG. 4, schematically illustrating steps of such method. Furthermore, reference is made to the hydrogen combustion engine system 10 of FIGS. 1 and 2, and the hydrogen combustion engine 15 shown in FIG. 3A. Thus, the hydrogen combustion engine system 10 applicable to the method comprises at least a selective catalyst reduction, SCR, catalyst 40 and an ammonia slip catalyst, ASC, 50 arranged downstream of the SCR catalyst 40. The method described with reference to the flowchart of FIG. 4 may e.g. be performed in response to a desire to regenerate the ASC 50.

In a step S10, e.g. being a first step S10, a regeneration time window for performing regeneration of the ASC 50 is identified. The regeneration time window is defined at least by that the temperature of the EATS 20 is above a predetermined lower limit and that the temperature of the SCR catalyst 40 is below a predetermined upper limit.

The temperature of the EATS 20 may be determined by an average temperature over the EATS 20, or as the temperature at the exhaust gas inlet 22, or as the temperature of the EATS outlet 24, or as the temperature of the SCR catalyst 40. Such temperature measurement may be achieved by one or more of the previously mentioned temperature sensors, 33, 35, 36a, 36b. The step S10 may be performed subsequent to a step S5 of comparing a determined temperature of the EATS 20 to the predetermined lower limit, and comparing a determined temperature of the SCR catalyst 40 to the predetermined upper limit. For example, the predetermined lower limit may be a threshold value set to between 200° C. and 250° C., e.g. to 200° C., and the predetermined upper limit may be a threshold value is set to between 300° C. and 400° C., e.g. to 350° C.

The regeneration time window may be further defined at least by that the amount of NOx and/or NH3 downstream of the ASC 50 is above a respective predetermined emission threshold value. The NOx and/or NH3 downstream of the ASC 50 may be determined by the previously mentioned NOx sensor 37. The step S5 may thus comprise the sub-steps of determining the amount of NOx and/or NH3 downstream of the ASC 50, and comparing the determined amount of NOx and/or NH3 to a predetermined emission threshold value for the NOx and a predetermined emission threshold value for the NH3.

The regeneration time window may additionally or alternatively be further defined by an absence of engine braking of the hydrogen combustion engine. The step S5 may thus comprise the sub-step of determining whether engine braking of the hydrogen combustion engine 15 is present or not.

In a step S20, performed in response of identifying the regeneration time window S10, the hydrogen combustion engine 15 is operated in an H2 exhaust excess mode. The H2 exhaust excess mode is defined by that the amount of unburnt H2 in the engine exhausts is at least 1.5 mol %.

In a step S21, the hydrogen combustion engine 15 is operated by injecting H2 in the engine cylinder 310 during an exhaust stroke of the piston. Typically, the H2 exhaust excess mode is comprised in a combustion mode of the hydrogen combustion engine, such as the previously described four stroke combustion mode, wherein the exhaust stroke is the exhaust stroke of the four stroke cycle previously described. However, it should be noted that the H2 exhaust excess mode may alternatively be comprised in a non-combustion mode of the hydrogen combustion engine 15. For a combustion mode, H2 is injected into the engine cylinder 310 after combustion, and may thus be passed to the engine exhausts via the exhaust passage 317 without being burned, at least to reach an excess of unburnt H2 as defined above. For example, the H2 is injected into the engine cylinder 310 and the combustion chamber 314 after the exhaust valve 318 has opened, such as e.g. at least 10 crank angle degrees after the exhaust valve 318 has opened. Additionally or alternatively, H2 is injected into the engine cylinder 310 and the combustion chamber 314 between 90 crank angle degrees before TDC, and TDC.

In a step S22, the hydrogen combustion engine 15 is operated by injecting H2 in the engine cylinder 310 during a compression stroke of the piston, to reach a target lambda. Hereby, combustion of H2 in the engine cylinder 310 and the combustion chamber 314 is achieved. The target lambda is typically above 1, such as e.g. between 1.5 and 3. It should be noted that the order of steps S21 and S22 may be reversed, and/or cycled.

As evident by steps S21 and S22, H2 may be injected into the engine cylinder 310 at least twice during one operating cycle (e.g. the four stroke cycle previously described) by a primary H2 injection during the compression stroke in step S22, and a secondary H2 injection during the exhaust stroke in step S21.

As shown in FIG. 3A, the same fuel injector 403 may be used for both the primary H2 injection and the secondary H2 injection. In other words, both steps S21 and S22 may be achieved by the fuel injector 403.

Figure 3B:
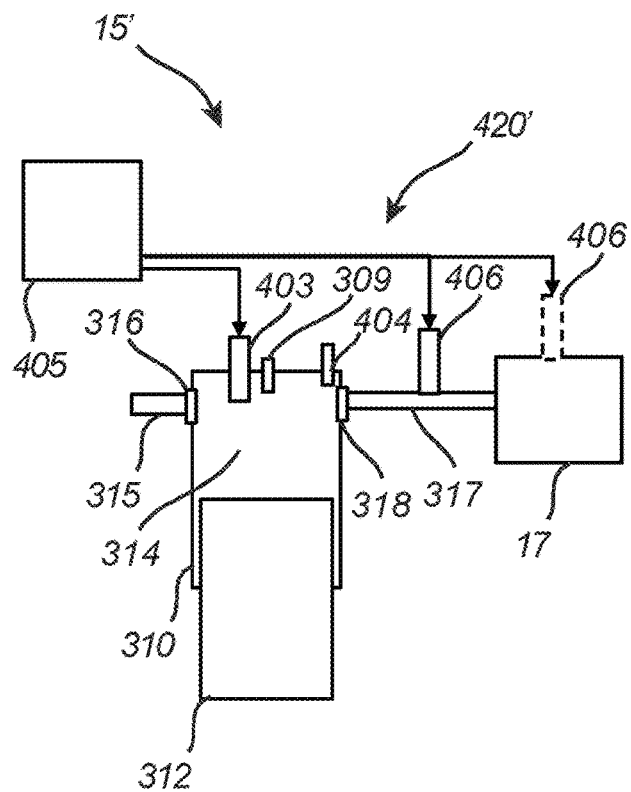
FIG. 3B is a schematic view of at least parts of a hydrogen combustion engine according to yet another example embodiment of the present invention.

A further alternative is shown in FIG. 3B. FIG. 3B is schematic illustration of the same engine cylinder 310 and piston 312 as in FIG. 3A, why the same reference numerals are used for indicating the same or corresponding features.

In the hydrogen combustion engine 15' of FIG. 3B, the fuel injector 403 also shown in FIG. 3A is a primary fuel injector 403 configured to perform the primary H2 injection. Moreover, the hydrogen combustion engine 15' comprises a secondary fuel injector 406 configured to perform the secondary H2 injection. As shown in FIG. 3B, the secondary fuel injector 406 may be arranged downstream of the exhaust valve 318 of the engine cylinder 310. Thus, the secondary H2 injection may be performed outside of the engine cylinder 310 (and thus be made less dependent of the operating cycle of the engine cylinder), and directly into the exhausts passage 317 in order to achieve an amount of unburnt H2 of at least 1.5 mol % in the engine exhausts. Briefly turning back to FIG. 4, this is exemplified by a step S23, being performed as an alternative to at least step S21, wherein step S23 comprises operating the hydrogen combustion engine by injecting H2 downstream of the exhaust valve 318 of at least one of the engine cylinders 310 in the hydrogen combustion engine 15. As also shown in FIG. 3B, the secondary fuel injector 406 may alternatively be positioned at the engine outlet 17, which is indicated by the dashed box 406. The engine outlet 17 is e.g. a common outlet for a plurality of engine cylinders prior to that the engine exhausts are transferred to the EATS 20. Other positions of the secondary fuel injector 406 are conceivable, e.g. somewhere between downstream of the exhaust valve 318 of at least one of the engine cylinder 310, and upstream of the exhaust gas inlet 22 (shown in FIG. 2). As a further alternative embodiment, not disclosed in FIG. 3B, the secondary fuel injector is arranged and configured to inject the secondary H2 injection into the engine cylinder 310.

Preferably, both the primary and secondary fuel injectors 403, 406 are configured to supply H2 from the H2 storage tank 405.

Turning back to FIG. 4. In a step S24, the hydrogen combustion engine 15 is operated by injecting water during an intake stroke in the engine cylinder 310. This is typically achieved by the previously mentioned water inlet arrangement 404.

As shown in FIG. 4, the steps S21, S22, S23 and S24 may be sub-steps to the step S20 of operating the hydrogen combustion engine in the H2 exhaust excess mode. That is, steps S21, S22, S23 and S24 may be performed during operation of the hydrogen combustion engine 15 in the H2 exhaust excess mode.

In a step S26, the unburnt H2 is transported from the engine outlet 17 of the hydrogen combustion engine 15 to the ASC 50. The transportation is preferably carried out such that the mol fraction of the H2 in the exhaust gases reaching the ASC 50 is at least 80% of that at the engine outlet 17.

In a step S30, the ASC 50 is regenerated using the unburnt H2 in the engine exhausts. During the regeneration of the ASC 50, H2 is burned in the ASC 50 resulting in an increased temperature, whereby regeneration of the ASC 50 is achieved. The regeneration temperature is at least 500° C. That is, the temperature of the ASC during the regeneration is at least 500° C.

In a step S40, operation of the hydrogen combustion engine 15 in the H2 exhaust excess mode is terminated. This is e.g. performed in response to a requested torque or brake power of the hydrogen combustion engine 15 over a corresponding threshold value. One or more of the previously mentioned criteria for operating the hydrogen combustion engine 15 in the H2 exhaust excess mode may additionally or alternatively be determined as no longer being fulfilled, whereby the operation of the hydrogen combustion engine 15 in the H2 exhaust excess mode is terminated S40. As a further alternative, operation of the hydrogen combustion engine 15 in the H2 exhaust excess mode is terminated in response to that the regeneration of the ASC 50 is completed.

As also shown in FIG. 4, in a step S15 performed in response of not identifying the regeneration time window from step S5, the hydrogen combustion engine 15 is prevented to be operated in the H2 exhaust excess mode. Hereby, regeneration of the ASC 50 using unburnt H2 in the engine exhausts is avoided or prohibited. For example, the method may comprise a step S12 of identifying a non-regeneration time window in which regeneration of the ASC is to be avoided, the non-regeneration time window being defined at least by that the temperature of the EATS 20 is below the predetermined lower limit and/or that the temperature of the SCR catalyst 40 is above the predetermined upper limit. Instead of operating the hydrogen combustion engine 15 in the H2 exhaust excess mode, the hydrogen combustion engine 15 may be operated in a default (or normal) combustion mode. Thus, one example of preventing the hydrogen combustion engine 15 to be operated in the H2 exhaust excess mode in steps S15 is to operate the hydrogen combustion engine 15 in said default (or normal) combustion mode. During such default combustion mode, only the previously primary H2 injection is utilized, and not the secondary H2 injection. The default combustion mode in S15 is typically corresponding to a four stroke cycle.

It should be noted that the SCR catalyst 40, the ASC 50 and the particulate filter 60 may be housed in separate containers or canisters.

It is to be understood that the present invention is not limited to the embodiments described above and illustrated in the drawings; rather, the skilled person will recognize that many changes and modifications may be made within the scope of the appended claims. For example, the EATS may be used for cleaning exhaust gases of other engines than hydrogen combustion engines, e.g. in a dual-fuel engine system (in which one of the engines is a hydrogen combustion engine). For example, the present EATS may be used to clean exhaust gases, e.g. by converting NOx emissions, from the exhaust of internal combustion engines based on H2 (Hydrogen) or a mix of H2 and natural gas.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for controlling the operation of a hydrogen combustion engine system of a vehicle, the hydrogen combustion engine system comprising a hydrogen combustion engine and an exhaust aftertreatment system, EATS, configured to reduce emissions in the engine exhausts, the EATS comprising a selective catalyst reduction, SCR, catalyst and an ammonia slip catalyst, ASC, arranged downstream of the SCR catalyst, wherein the method comprises:

identifying a regeneration time window for performing regeneration of the ASC, the regeneration time window being defined at least by that the temperature of the EATS is above a predetermined lower limit and that the temperature of the SCR catalyst is below a predetermined upper limit; and in response of identifying the regeneration time window, operating the hydrogen combustion engine in an H2 exhaust excess mode defined by an amount of unburnt H2 of at least 1.5 mol % in the engine exhaust and regenerating the ASC by using the unburnt H2 in the engine exhausts, reaching a regeneration temperature of at least 500° C.

2. The method according to claim 1, wherein the H2 exhaust excess mode comprises operating the hydrogen combustion engine by injecting H2 in the engine cylinder during an exhaust stroke.

3. The method according to claim 1, wherein the H2 exhaust excess mode comprises operating the hydrogen combustion engine by injecting H2 downstream of an exhaust valve of at least one of the engine cylinders in the hydrogen combustion engine.

4. The method according to claim 1, wherein the H2 exhaust excess mode is comprised in a combustion mode of the hydrogen combustion engine.

5. The method according to claim 1, wherein the H2 exhaust excess mode is comprised in a non-combustion mode of the hydrogen combustion engine.

6. The method according to claim 1, wherein the regeneration time window is further defined at least by that the amount of NOx and/or NH3 downstream of the ASC is above a respective predetermined emission threshold value.

7. The method according to claim 1, wherein the regeneration time window is further defined by an absence of engine braking of the hydrogen combustion engine.

8. The method according to claim 1, further comprising: transporting the unburnt H2 from an engine outlet of the hydrogen combustion engine to the ASC such that the mol fraction of the H2 in the exhaust gases reaching the ASC is at least 80% of that at the engine outlet.

9. The method according to claim 1, further comprising: terminating operation of the hydrogen combustion engine in the H2 exhaust excess mode in response to a requested torque or brake power of the hydrogen combustion engine over a corresponding predetermined threshold value.

10. A computer program comprising program code means comprising instructions to cause a hydrogen combustion engine system to execute the steps of the method according to claim 1, when said program is run on a computer.

11. A non-transitory computer readable medium carrying a computer program comprising program code comprising instructions to cause a hydrogen combustion engine system, to execute the steps of the method according to claim 1, when said computer program is run on a computer.

12. A hydrogen combustion engine system for a vehicle, the hydrogen combustion engine system comprising a hydrogen combustion engine and an exhaust aftertreatment system, EATS, configured to reduce emissions in the engine exhausts, the EATS comprising a selective catalyst reduction, SCR, catalyst and an ammonia slip catalyst, ASC, arranged downstream of the SCR catalyst, wherein the hydrogen combustion engine system comprises a control unit configured to:
- identify a regeneration time window for performing regeneration of the ASC, the regeneration time window being defined at least by that the temperature of the EATS is above a predetermined lower limit and that the temperature of the SCR catalyst is below a predetermined upper limit;
- in response of identifying the regeneration time window, instruct the hydrogen combustion engine to operate in an H2 exhaust excess mode defined by an amount of unburnt H2 of at least 1.5 mol % in the engine exhaust for using the unburnt H2 in the engine exhausts to regenerate the ASC by reaching a regeneration temperature of at least 500° C.

13. The hydrogen combustion engine system according to claim 12, wherein the EATS is free of any oxidation catalyst arranged downstream of an exhaust gas inlet of the EATS, and upstream of the ASC.

14. A vehicle comprising an hydrogen combustion engine system according to claim 12.

* * * * *